(12) United States Patent
Kasaini

(10) Patent No.: US 11,607,734 B2
(45) Date of Patent: Mar. 21, 2023

(54) METHODS FOR THE PRODUCTION OF FINE METAL POWDERS FROM METAL COMPOUNDS

(71) Applicant: HELA Novel Metals LLC, Woburn, MA (US)

(72) Inventor: Henry W. Kasaini, Centennial, CO (US)

(73) Assignee: HELA NOVEL METALS LLC, Woburn, MA (US)

( * ) Notice: Subject to any disclaimer, the term of this patent is extended or adjusted under 35 U.S.C. 154(b) by 723 days.

(21) Appl. No.: 16/427,310

(22) Filed: May 30, 2019

(65) Prior Publication Data

US 2020/0047256 A1 Feb. 13, 2020

Related U.S. Application Data

(60) Provisional application No. 62/678,247, filed on May 30, 2018.

(51) Int. Cl.
| | |
|---|---|
| B22F 9/30 | (2006.01) |
| B22F 1/142 | (2022.01) |
| C01F 17/30 | (2020.01) |

(52) U.S. Cl.
CPC ............... *B22F 9/30* (2013.01); *B22F 1/142* (2022.01); *C01F 17/30* (2020.01); *B22F 2301/45* (2013.01); *B22F 2302/45* (2013.01)

(58) Field of Classification Search
CPC .. B22F 1/142; B22F 3/001; B22F 9/30; B22F 2301/45; B22F 2302/45; C04B 2235/449; C22B 3/322
See application file for complete search history.

(56) References Cited

U.S. PATENT DOCUMENTS

| | | | |
|---|---|---|---|
| 2,636,892 | A | 4/1953 | Mayer |
| 2,660,523 | A | 11/1953 | De |

(Continued)

FOREIGN PATENT DOCUMENTS

| | | |
|---|---|---|
| CL | 2016003303 A1 | 8/2017 |
| CN | 101781186 A | 7/2010 |

(Continued)

OTHER PUBLICATIONS

Carney C. S. et al, "Rapid nickel oxalate thermal decomposition for producing fine porous nickel metal powders Part 1: Synthesis", Materials Science and Engineering, Elsevier, 431, pp. 1-12, (2006).

(Continued)

*Primary Examiner* — Anthony J Zimmer
*Assistant Examiner* — Dean Mazzola
(74) *Attorney, Agent, or Firm* — David F. Dockery; The Navitas Intellectual Property Group LLC

(57) ABSTRACT

Methods for the manufacture of fine metal powders from metal carboxylate compounds such as metal oxalate compounds. The method includes decomposing particulates of the metal oxalate compound by heating to a decomposition temperature in the presence of a dilute hydrogen gas to decompose the metal oxalate compound, and forming a fine metal powder by heating to a higher refining temperature to remove contaminants from the metal powder. The method may include the conversion of a non-oxalate metal compound to a hydrated metal oxalate and the dehydration of the hydrated metal oxalate before decomposition to the metal. The method is applicable to the production of a wide variety of metals, and is particularly applicable to the production of rare earth metals of high purity and fine particle size.

17 Claims, 2 Drawing Sheets

(56) References Cited

U.S. PATENT DOCUMENTS

| | | |
|---|---|---|
| 2,815,264 A | 12/1957 | Calkins et al. |
| 3,186,829 A | 6/1965 | Landgraf |
| 3,190,748 A | 6/1965 | Landgraf |
| 3,377,160 A | 4/1968 | Schroeder |
| 3,484,376 A | 12/1969 | Paris et al. |
| 3,574,685 A | 4/1971 | Haines |
| 3,625,779 A | 12/1971 | Cech |
| 3,923,496 A | 12/1975 | Pall |
| 3,925,114 A | 12/1975 | Takahashi et al. |
| 3,928,089 A | 12/1975 | Cech |
| 3,955,961 A | 5/1976 | Jordan |
| 3,965,046 A | 6/1976 | Deffeyes |
| 3,976,749 A | 8/1976 | Wedemeyer |
| 4,004,917 A | 1/1977 | Deffeyes et al. |
| 4,438,078 A | 3/1984 | Nalewajek |
| 4,578,242 A | 3/1986 | Sharma |
| 4,680,055 A | 7/1987 | Sharma |
| 4,751,070 A | 6/1988 | Pai Verneker |
| 4,992,096 A | 2/1991 | Skach, Jr. et al. |
| 5,314,526 A | 5/1994 | Sharma |
| 5,759,230 A | 6/1998 | Chow et al. |
| 5,776,264 A | 7/1998 | McCandlish et al. |
| 6,126,712 A | 10/2000 | Hohne et al. |
| 6,464,750 B1 | 10/2002 | Tailhades et al. |
| 6,676,729 B2 | 1/2004 | Sun |
| 6,679,938 B1 | 1/2004 | Kim et al. |
| 6,689,191 B2 | 2/2004 | Dunmead et al. |
| 6,830,823 B1 | 12/2004 | Kodas et al. |
| 6,887,296 B2 | 5/2005 | Mende et al. |
| 6,974,493 B2 | 12/2005 | Harutyunyan et al. |
| 8,211,388 B2 | 7/2012 | Woodfield et al. |
| 8,721,762 B2 | 5/2014 | Wu |
| 9,017,448 B2 | 4/2015 | Arquilliere et al. |
| 9,255,337 B2 | 2/2016 | Derezinski et al. |
| 9,376,735 B2 | 6/2016 | Jacobson et al. |
| 9,931,607 B2 | 4/2018 | Von Haeften et al. |
| 2002/0018896 A1 | 2/2002 | Fukunaga et al. |
| 2002/0029824 A1* | 3/2002 | Kawano .............. B22F 9/20 148/105 |
| 2004/0050207 A1 | 3/2004 | Wooldridge et al. |
| 2004/0235650 A1 | 11/2004 | Saleh et al. |
| 2008/0032132 A1 | 2/2008 | Woodfield et al. |
| 2012/0156116 A1 | 6/2012 | Gao et al. |
| 2012/0207656 A1 | 8/2012 | Duyvesteyn |
| 2014/0341790 A1 | 11/2014 | Kasaini |
| 2016/0002751 A1 | 1/2016 | Kasaini |
| 2017/0260606 A1 | 9/2017 | Kasaini |

FOREIGN PATENT DOCUMENTS

| | | |
|---|---|---|
| CN | 106430278 A | 2/2017 |
| CN | 106270554 B | 4/2018 |
| EP | 0170372 B1 | 8/1988 |
| EP | 0508757 A1 | 10/1992 |
| GB | 419953 A | 11/1934 |
| GB | 477230 A | 12/1937 |
| GB | 517455 A | 1/1940 |
| GB | 542145 A | 12/1941 |
| GB | 672354 A | 5/1952 |
| GB | 679172 A | 9/1952 |
| GB | 726264 A | 3/1955 |
| GB | 1109890 A | 4/1968 |
| KR | 20170042661 A | 4/2017 |
| WO | 2016025928 A1 | 2/2016 |

OTHER PUBLICATIONS

Extended European Search Report dated Feb. 2, 2022 for European Patent Application No. 19810632.0.

Office Action dated Jan. 24, 2022 for Canadian Patent Application No. 3,101,795.

International Search Report and Written Opinion dated Sep. 27, 2019 for International Patent Application No. PCT/US2019/034752.

Liu et al.; "Study of Adsorption of Hydrogen on Al, Cu, Mg, Ti Surfaces in Al Alloy Melt via First Principles Calculation"; Metals; 2017; 7, 21; 9 pgs.

James; "Powder Metallurgy Methods and Applications"; ASM Intl.; ASM Handbook, vol. 7, Powder Metallurgy; 2015; pp. 9-19.

Seisenbaeva et al.; "Heterometallic Alkoxide Complexes of Variable Composition—A New Way to Ultrafine Powders of Metal Alloys"; Journal of Sol-Gel Science and Technology; 19; 2000; pp. 285-288.

Srivastava et al.; "Thermal Decomposition of Oxalates of Lanthanum and Thorium in Vacuum"; Jul. 1965; vol. 47, No. 3; pp. 87-96.

Wallace S. Chase, The Decomposition of Cerous Oxalate in a Reducing of Inert Atmosphere and a New Property of the Higher Oxides of Cerium, J. Am. Chem. Soc. 1917, 39, 8, 1576-1582, retrieved from the internet https://pubs.acs.org/doi/abs/10.1021/ja02253a005.

Office Action dated Sep. 22, 2022 for Canadian Patent Application No. 3,101,795.

* cited by examiner

METHODS FOR THE PRODUCTION OF FINE METAL POWDERS FROM METAL COMPOUNDS

CROSS-REFERENCE TO RELATED APPLICATIONS

This application claims the priority benefit under 35 USC § 119(e) of U.S. Provisional Patent Application No. 62/678,247 filed on May 30, 2018, which is incorporated herein by reference in its entirety.

FIELD

This disclosure relates to the field of powder metallurgy, and in particular relates to the production of fine metal powders from metal compounds.

BACKGROUND

Metal powders are utilized to fabricate a wide variety of products. For many products, the metal powders must have a fine particle size (e.g., of 100 μm or lower) and must have a high purity, e.g., including few contaminants. In most cases, elemental metals do not occur naturally in large quantities, and the metal powders must be produced from compounds containing the metals.

However, most industrial processes for reducing metal compounds to metal powders require high capital costs and/or operating costs. For example, one method for the reduction of rare earth compounds (e.g., rare earth oxides, rare earth chlorides) to rare earth metals involves dispersing the rare earth compound in a molten salt bath, e.g., a molten chloride salt bath, containing a reducing metal and separating the rare earth metal from the bath after the rare earth compound has been reduced. Other commercialized methods involve the leaching (dissolution) of the metal compound in an inorganic acid followed by solvent extraction to purify the metal salt solution. The metal salt solution is then subjected to electrolysis to form a bulk metal, which is then melted and atomized to form the metal powder.

SUMMARY

There is a need for a rapid and less costly method for the production of fine metal powders of high purity from metal compounds. Specifically, there is a need for such a method that has relatively low capital costs for specialized equipment, and that consumes relatively low quantities of reagents and power (e.g., electricity).

In one embodiment of the present disclosure, a method for the production of fine metal powder from metal compound particulates is disclosed. Broadly characterized, the method includes the steps of heating anhydrous metal oxalate compound particulates to a decomposition temperature and holding the anhydrous metal oxalate compound particulates under a decomposition gas, the decomposition gas and the decomposition temperature being sufficient to decompose the anhydrous metal oxalate compound particulates and form a gaseous oxalate by-product. The gaseous oxalate by-product is separated from the anhydrous metal oxalate compound particulates as the gaseous oxalate by-product is formed, whereby intermediate metal product particulates are formed. The intermediate metal product particulates are then heated to a refining temperature that is greater than the decomposition temperature, and are held at the refining temperature and under a refining gas composition to reduce the concentration of contaminants in the intermediate metal product particulates and form the fine metal powder.

The foregoing method may be subject to refinements, characterizations and/or additional steps, which may be implemented alone or in any combination. Such refinements, characterizations and/or additional steps will be apparent from the following description.

In one refinement, the method includes the step of dehydrating hydrated metal oxalate compound particulates to remove water of hydration therefrom and form the anhydrous metal oxalate compound particulates and water vapor. The step of dehydrating may include heating the hydrated metal oxalate compound particulates, and in one aspect includes heating the hydrated metal oxalate compound particulates to a temperature of at least about 240° C. In another aspect, the heating step is carried out at a temperature of not greater than about 340° C. In another aspect, the water vapor is separated from the hydrated metal oxalate compound particulates during the step of dehydrating the hydrated metal oxalate compound particulates.

DESCRIPTION OF THE EMBODIMENTS

Figure 1:
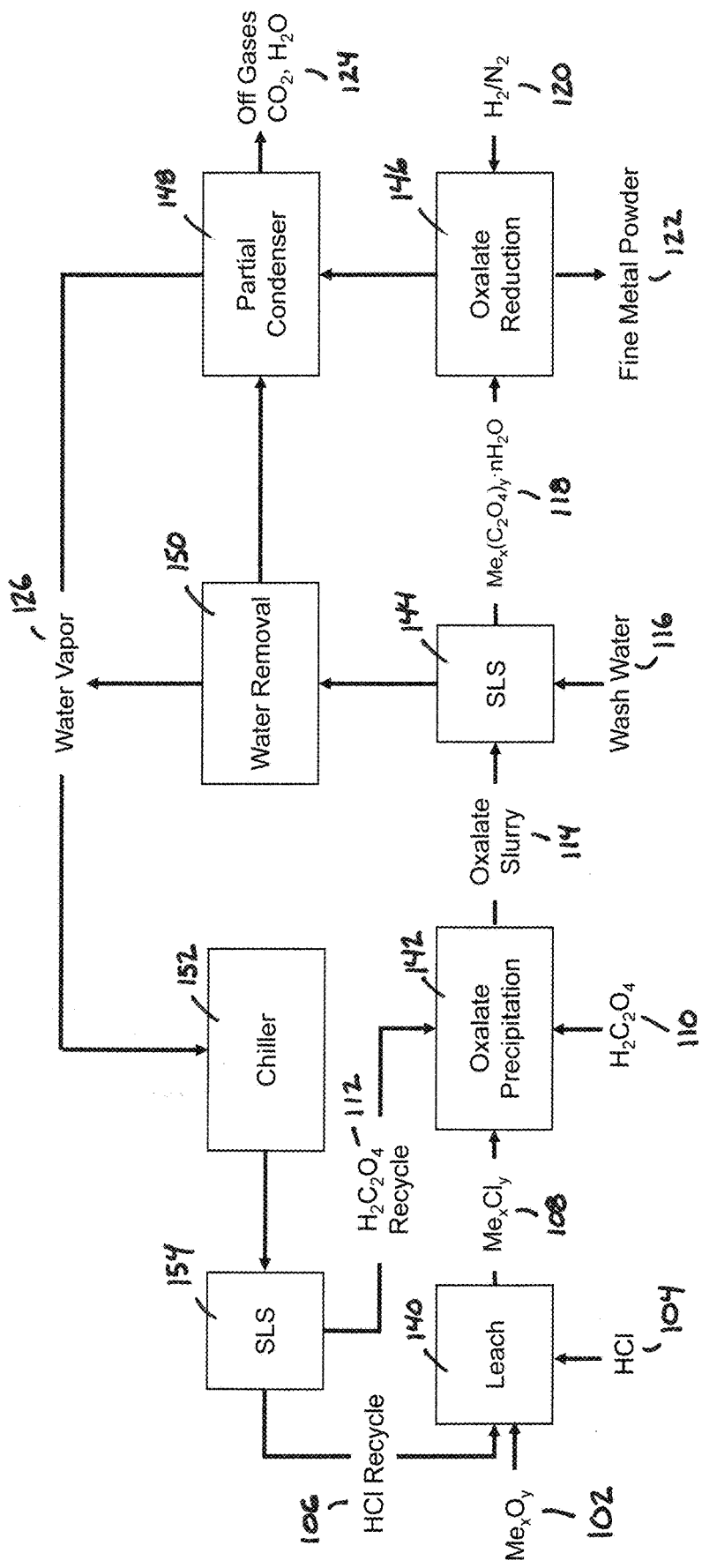
FIG. 1 illustrates a schematic flowsheet of a method for the production of a fine metal powder according to an embodiment of the present disclosure.

The present disclosure is directed to methods for the production of fine metal powders from metal compounds, particularly from metal carboxylate compounds, e.g., from metal compounds comprising the metal, carbon, oxygen and possibly hydrogen. The method is applicable to the production of a wide range of fine metal powders, and is particularly useful for the production of fine powders of rare earth metals, e.g., scandium, yttrium, lanthanum, cerium, praseodymium, neodymium, samarium, europium, gadolinium, terbium, dysprosium, holmium, erbium, thulium, ytterbium and lutetium. The method may also be useful for the production of other metals including, but not limited to, copper, iron, nickel, cobalt, lithium, platinum and palladium. The method is also useful for the production of mixed metal powders, which may be readily fabricated into metal alloys.

Broadly characterized, the method includes heating metal compound particulates under a decomposition gas (e.g., in a decomposition gas atmosphere) that is substantially free of water vapor and oxygen to decompose the metal compound particulates to the corresponding metal. The decomposition gas may include hydrogen ($H_2$) and/or ammonia ($NH_4$), and nitrogen ($N_2$). The fine metal powder may be of very fine particle size and of high purity. The method is rapid and economical as compared to known methods for the production of fine metal powders of high purity from metal compounds.

Accordingly, one embodiment of the present disclosure is directed to a method for the production of a fine metal powder, e.g., a powder batch predominately comprising free-flowing elemental metal powder, from a metal compound, e.g., from metal compound particulates. The metal compound particulates may comprise a metal carboxylate compound, e.g., a metal oxalate of the form $Me_2C_2O_4$, $MeC_2O_4$, $Me_2(C_2O_4)_3$, etc. where Me is the metal. Although the following description refers specifically to the formation of fine metal powders from metal oxalate compound particulates, it is contemplated that the methods described herein may also be implemented using other metal carboxylate compounds.

The metal oxalate compound particulates that are decomposed to the fine metal powder comprise an anhydrous metal oxalate compound, i.e., the metal oxalate compound comprises little to no water of hydration (i.e., water of crystallization). In one embodiment, the anhydrous metal oxalate compound is decomposed by heating the anhydrous metal oxalate compound particulates to a first temperature (e.g., a decomposition temperature) and holding the anhydrous metal oxalate compound particulates under a gas composition (e.g., a decomposition gas), where the decomposition gas and the decomposition temperature are sufficient to decompose the anhydrous metal oxalate compound and form intermediate metal product particulates and a gaseous oxalate by-product. While the particulate anhydrous metal oxalate compound is being heated and is decomposing, the released gaseous oxalate by-product may be separated from the intermediate metal product particulates. The intermediate particulate metal product, which predominately includes metal particulates, is then heated under a second reducing gas composition (e.g., a refining gas composition) to a second temperature (e.g., a refining temperature) that is greater than the decomposition temperature to reduce the concentration of contaminants and form the fine metal powder having a high purity.

Thus, the method results in the formation of a fine metal powder from metal oxalate compound particulates. The metal oxalate compound may be an anhydrous metal oxalate compound, i.e., a metal oxalate compound that includes substantially no water of hydration (i.e., water of crystallization). In this case, the anhydrous metal oxalate compound particulates can be directly heated under a decomposition gas to decompose the metal oxalate compound and form the gaseous oxalate by-product.

In most cases, however, metal oxalate compounds are hydrated metal oxalate compounds that include water of hydration, e.g., $MeC_2O_4 \cdot nH_2O$, where n can range from 1 to 12, for example. Table I illustrates the concentrations in weight percent for typical hydrated and anhydrous metal oxalate compounds.

TABLE I

| Metal Oxalate | Hydrated Metal Oxalates $Me_x(C_2O_4)_y \cdot nH_2O$ | | | Anhydrous Metal Oxalates $Me_x(C_2O_4)_y$ | |
|---|---|---|---|---|---|
| | $Me_x$ (wt. %) | $(C_2O_4)_y$ (wt. %) | $nH_2O$ (wt. %) | $Me_x$ (wt. %) | $(C_2O_4)_y$ (wt. %) |
| $La_2(C_2O_4)_3 \cdot nH_2O$ | 38.48 | 36.57 | 24.95 | 51.27 | 48.73 |
| $Nd_2(C_2O_4)_3 \cdot nH_2O$ | 39.37 | 36.04 | 24.59 | 52.21 | 47.79 |
| $Pr_2(C_2O_4)_3 \cdot nH_2O$ | 38.82 | 36.37 | 24.81 | 51.63 | 48.37 |
| $Sm_2(C_2O_4)_3 \cdot nH_2O$ | 40.37 | 35.45 | 24.18 | 53.25 | 46.75 |
| $Dy_2(C_2O_4)_3 \cdot nH_2O$ | 42.25 | 34.33 | 23.42 | 55.17 | 44.83 |
| $Tb_2(C_2O_4)_3 \cdot nH_2O$ | 41.71 | 34.65 | 23.64 | 54.62 | 45.38 |
| $Y_2(C_2O_4)_3 \cdot nH_2O$ | 28.59 | 42.45 | 28.96 | 40.24 | 59.76 |
| $Sc_2(C_2O_4)_3 \cdot nH_2O$ | 18.73 | 55.00 | 30.02 | 26.76 | 78.60 |
| $Fe_2(C_2O_4)_3 \cdot nH_2O$ | 31.04 | 48.93 | 20.03 | 38.82 | 61.18 |
| $CoC_2O_4 \cdot nH_2O$ | 32.21 | 48.10 | 19.69 | 40.10 | 59.90 |
| $NiC_2O_4 \cdot nH_2O$ | 32.12 | 48.17 | 19.72 | 40.00 | 59.99 |
| $NbC_2O_4 \cdot nH_2O$ | 24.71 | 58.52 | 16.77 | 29.69 | 70.31 |
| $Li_2(C_2O_4) \cdot nH_2O$ | 10.06 | 63.81 | 26.12 | 13.62 | 86.38 |

As can be seen in Table I, hydrated metal oxalate compounds typically include from about 23 wt. % to about 30 wt. % water of hydration. According to the present disclosure, it is desirable to dehydrate the hydrated metal oxalate compound particulates, i.e., to remove the water of hydration and form the anhydrous metal oxalate compound particulates and water vapor, before decomposition of the anhydrous metal oxalate compound particulates. In one embodiment, hydrated metal oxalate compound particulates are dehydrated by heating the particulates to an elevated dehydration temperature, such as to a temperature of at least about 150° C., such as at least about 180° C., such as at least about 200° C., such as at least about 220° C., such as at least about 240° C., or even at least about 260° C. Such dehydration temperatures are typically sufficient remove the water of hydration and reduce the size of the metal oxalate compound particulates as a result of the water loss. The temperature at which water of hydration can be removed from a metal oxalate compound is also influenced by the pressure under which the heating occurs. In any event, the hydrated metal oxalate compound particulates should not be subjected to conditions of excess heat and pressure during dehydration that would lead to substantial decomposition of the metal oxalate (e.g., to the metal) before substantially all of the water of hydration has been removed from the particulates. For most metal oxalate compounds, the temperature during the heating step to remove the water of hydration should not be greater than about 440° C., such as not greater than about 400° C., such as not greater than about 360° C., such as not greater than about 340° C., such as not greater than about 320° C., such as not greater than about 300° C. As with the minimum temperatures for dehydration of the hydrated metal oxalate compound particulates described above, the maximum desirable temperature for dehydration will be influenced by the pressure under which the heating step is carried out (e.g., the dehydration pressure). In one characterization, the step of heating the hydrated metal oxalate compound particulates is carried out at a dehydration temperature in the range of from about 240° C. to about 340° C., at about ambient pressure.

It is also desirable to separate the water vapor released from the hydrated metal oxalate compound particulates during the dehydrating step to prevent the water vapor from recombining with the metal oxalate compound. For example, a sweep gas (e.g., a dehydration gas) may be moved past (e.g., through) the metal oxalate compound particulates to separate the water vapor from the particulates and carry the vapor out of the reactor. The dehydration gas may comprise an inert gas, e.g., nitrogen, argon, helium etc., and in one characterization the dehydration gas comprises nitrogen, and may consist essentially of nitrogen. The dehydration gas may also comprise relatively small concentrations of hydrogen, such as not greater than about 12% hydrogen, and in one embodiment includes up to about 6% hydrogen. It is desirable that the sweep gas have a low oxygen content, and in one embodiment the sweep gas comprises not greater than about 1% oxygen, such as not greater than about 0.5% oxygen, such as not greater than about 0.1% oxygen, or even not greater than about 0.05% oxygen. In one characterization, a sealed reactor containing the hydrated metal oxalate compound particulates is evacuated (e.g., to form a vacuum or near vacuum) and the sweep gas is introduced as the dehydrating step begins (e.g., as the heating begins). The presence of the sweep gas and the generated water vapor may cause the pressure in the reactor to subsequently rise during the dehydration step, e.g., up to about 3 bar.

The step of dehydrating the hydrated metal oxalate compound particulates should be carried out under an elevated temperature and for a time to remove substantially all of the water of hydration from the hydrated metal oxalate compound particulates. In one embodiment, the dehydration step removes at least about 95% of the water of hydration from the hydrated metal oxalate compound particulates, such as at least about 98% of the water of hydration, such as at least about 99% of the water of hydration, at least about 99.5% of the water of hydration, or even at least about 99.9% of the water of hydration from the hydrated metal oxalate compound particulates.

Once the hydrated metal oxalate compound particulates have been dehydrated, or if the metal oxalate particulates are provided in an anhydrous form, the anhydrous metal oxalate compound particulates are decomposed to form intermediate metal product particulates and a gaseous oxalate by-product. The decomposition may be carried out by heating the anhydrous metal oxalate compound particulates to an elevated temperature. In one embodiment, the anhydrous metal oxalate compound particulates are heated to a temperature (e.g., a decomposition temperature) that may be higher than the dehydration temperature. In one embodiment, the decomposition temperature is at least about 320° C., such as at least about 360° C., such as at least about 400° C., at least about 440° C., at least about 480° C., or even at least about 520° C. The decomposition temperature will typically be not greater than about 720° C., such as not greater than about 700° C., or even not greater than about 680° C.

The decomposition step is also carried out in the presence of a decomposition gas (e.g., in a reducing atmosphere) to facilitate the decomposition of the anhydrous metal oxalate compound to an intermediate metal product. The decomposition gas should have little to no oxygen, and in one embodiment the decomposition gas comprises not greater than about 0.5% oxygen, such as not greater than about 0.1% oxygen, such as not greater than about 0.05% oxygen, or even not greater than about 0.01% oxygen.

In one embodiment, the decomposition gas comprises dilute hydrogen. For example, the decomposition gas may comprise at least about 1% hydrogen, such as at least about 2% hydrogen, such as at least about 3% hydrogen. However, the decomposition gas should be dilute with respect to hydrogen, and in one characterization comprises not greater than about 20% hydrogen, such as not greater than about 18% hydrogen, such a not greater than about 15% hydrogen, or even not greater than about 12% hydrogen. In any case, it is an advantage of the methods disclosed herein that the decomposition gas may be dilute with respect to hydrogen. The required amount of hydrogen will depend upon several factors, including the fine metal powder that is formed. For example, it is believed that a higher concentration of hydrogen (e.g., 2% to 4%) is desirable for the decomposition of base metal oxalates, whereas a smaller concentration of hydrogen (e.g., up to about 2%) is desirable for the decomposition of rare earth metal oxalates.

In addition to hydrogen, decomposition gas may comprise an inert gas such as nitrogen. In one embodiment, the decomposition gas comprises at least about 50% nitrogen, such as at least about 60% nitrogen, such as at least about 70% nitrogen or even at least about 80% nitrogen. decomposition gas may also include carbon monoxide, e.g., in addition to hydrogen and nitrogen. In one embodiment, the decomposition gas comprises at least about 1% carbon monoxide, such as at least about 2% carbon monoxide. In another embodiment, the decomposition gas comprises not greater than about 30% carbon monoxide, such as not greater than about 25% carbon monoxide, such as not greater than about 20% carbon monoxide.

In one particular embodiment, the decomposition gas for decomposing the metal oxalate compound comprises nitrogen, hydrogen and carbon monoxide, with not greater than about 0.1% oxygen. In one characterization, the decomposition gas comprises from about 4% to about 12% hydrogen, from about 2% to about 20% carbon monoxide, and from about 68% to about 94% nitrogen.

In the foregoing description of the decomposition gas, ammonia ($NH_3$) may be substituted for all or a portion of the hydrogen. In one particular embodiment, the decomposition gas comprises nitrogen, ammonia and carbon monoxide, with not greater than about 0.1% oxygen. For example, the decomposition gas may comprise from about 4% to about 12% ammonia, from about 2% to about 20% carbon monoxide, and from about 68% to about 94% nitrogen.

The step of heating the anhydrous metal oxalate compound particulates to decompose the metal oxalate compound to the intermediate metal product may be carried out under atmospheric pressure. Better results, however, may be attained by decomposing the metal oxalate compound at an elevated pressure (e.g., a decomposition pressure). In one embodiment, the decomposition may be an elevated pressure such as at least about 1.5 bar, such as at least about 2 bar, or even at least about 2.5 bar. To avoid unnecessary overpressure, the decomposition pressure may be not greater than about 10 bar, such as not greater than about 8 bar, such as not greater than about 6 bar. In one characterization, the decomposition pressure is at least about 1 bar and is not greater than about 4 bar.

As noted above, the gaseous oxalate by-product (e.g., gaseous $H_2C_2O_4$) is separated from the anhydrous metal oxalate particulates during the decomposition of the metal oxalate compound. For example, the decomposition gas may be flowed through and/or around the anhydrous metal oxalate particulates. When the decomposition gas includes hydrogen, all or a portion of the gaseous oxalate by-product may be in the form of oxalic acid. When the decomposition gas includes ammonia, all or a portion of the gaseous oxalate by-product may be in the form of ammonium oxalate.

It is also an advantage that the gaseous oxalate by-product that is separated from the anhydrous metal oxalate compound (e.g., oxalic acid and/or ammonium oxalate) may be captured for recycle. In one embodiment, the captured gaseous oxalate by-product is condensed, crystallized and contacted with a non-oxalate metal compound to form a metal oxalate compound. For example, the captured oxalate crystals may be placed into solution and used to convert non-oxalate metal compound particulates to metal oxalate compound particulates, e.g., through a metathesis reaction. In one characterization, the non-oxalate metal compound comprises a metal oxide compound, a metal chloride compound, a metal sulfate compound and/or a metal carbonate compound.

After the decomposition of the anhydrous metal oxalate compound particulates to form the intermediate metal product, the intermediate metal product may be refined, i.e., may be treated to reduce the concentration of contaminants in the intermediate product, e.g., to reduce the concentration of non-metallic constituents associated with the metal powder. In one embodiment, the intermediate metal product is heated to a temperature (e.g., a refining temperature) that is greater than the decomposition temperature, e.g., that was used to decompose the anhydrous metal oxalate compound. In one embodiment, the intermediate metal product is heated above the decomposition temperature to a refining temperature of at least about 700° C., such as at least about 720° C., such as at least about 750° C., or even at least about 800° C.

Heating to excessive temperatures, however, are generally not necessary to provide a substantially contaminant-free fine metal powder. For example, the refining temperature will generally be not greater than about 1300° C., such as not greater than about 1250° C., such as not greater than about 1200° C., or even not greater than about 1150° C.

As with the decomposition step, the refining of the intermediate metal product to form the fine metal powder may be carried out in a reducing atmosphere, e.g., in a refining gas composition. The refining gas composition may have the same composition (e.g., same components and compositional ranges) as is described above for the decomposition gas, and in one embodiment, the refining gas composition is substantially the same as the decomposition gas.

The step of refining the intermediate metal product to remove contaminants and form the fine metal powder may also be carried out at an elevated pressure, e.g., at a refining pressure. For example, the refining pressure may be at least about 2 bar, such as at least about 2.5 bar, or even at least about 3 bar. Typically, the refining pressure will be not greater than about 10 bar, such as not greater than about 8 bar, such as not greater than about 6 bar. Heating under an elevated refining pressure with a dilute hydrogen refining gas composition will facilitate the penetration of the fine metal particles with the refining gas and the removal of contaminants from the metal powder.

The fine metal powder may then be cooled, e.g., passively cooled and/or actively cooled using a cooling gas. To avoid the formation of undesirable oxides, the cooling may take place in a low oxygen atmosphere, such as an atmosphere comprising not greater than about 1% oxygen, such as not greater than about 0.5% oxygen, such as not greater than about 0.1% oxygen, or even not greater than about 0.05% oxygen. The fine metal powder produced in accordance with the foregoing method may have a very high purity, e.g., a very low concentration of non-metallic impurities. In one embodiment, the fine metal powder comprises not greater than about 2% non-metallic impurities, such as not greater than about 1% non-metallic impurities, such as not greater than about 0.5% non-metallic impurities, or even not greater than about 0.1% non-metallic impurities. For example, the fine metal powder may comprise very low concentrations of oxygen (e.g., not greater than about 0.1% oxygen) and carbon (e.g., not greater than about 0.1% carbon). In another characterization, the fine metal powder comprises little to no carbon. For example, the fine metal powder may comprise not greater than about 0.1 wt. % carbon, such as not greater than about 0.05 wt. % carbon or even not greater than about 0.01 wt. % carbon.

To facilitate the desired reactions, the steps of heating the anhydrous metal oxalate compound particulates, of separating the gaseous oxalate by-product, and/or of heating the intermediate metal product particulates may be carried out while agitating the particulates, e.g., the particulate anhydrous metal oxalate and/or the intermediate metal particulates. For example, the process may be carried out in a fluidized bed reactor.

A wide variety of fine metal powders may be formed using the foregoing method. In one embodiment, the fine metal powder comprises a metal selected from the group consisting of rare earth metals, yttrium, scandium, aluminum, lithium, cobalt, nickel, copper and other base metals. The method is particularly applicable to the production of a fine metal powder comprising one or more rare earth metals. The method is also useful for the production of a fine metal powder admixture of at least two metals, e.g., by starting the with an admixture of two or more metal oxalate compounds. Such mixed metal powder products are useful for the fabrication (e.g., by sintering) of metal alloy products, including but not limited to magnetic products. In one embodiment, the fine metal powder comprises neodymium, iron and/or boron. In another embodiment, the fine metal powder comprises samarium and cobalt. In another embodiment, the fine metal powder comprises dysprosium and iron. In another embodiment, the fine metal powder comprises niobium and iron. In another embodiment, the fine metal powder comprises scandium and aluminum. In another embodiment, the fine metal powder comprises lithium and aluminum. In another embodiment, the fine metal powder comprises lithium and at least one additional metal selected from the group consisting of manganese, nickel and cobalt. For example, the fine metal powder may comprise lithium and cobalt.

In one embodiment, the median (D50) particle size of the fine metal powder may be not greater than about 30 μm, such as not greater than about 25 μm, such as not greater than about 15 μm, such as not greater than about 10 μm, such as not greater than about 5 μm, or even not greater than about 3 μm. Generally, the median particle size of the fine metal powder will be at least about 0.005 μm, such as at least about 0.01 μm, such as at least about 0.05 μm. In one characterization, the median particle size of the fine metal powder is at least about 0.01 μm and is not greater than about 10 μm. The fine metal powder product may also have a narrow particle size distribution, and the metal powders may have relatively low aspect ratio (i.e., the ratio of the longest dimension to the shortest dimension). The median particle size of the fine metal powder is largely a function of the median particle size of the incoming particulate metal oxalate compound(s). In this regard, the incoming particulate metal oxalate compound(s) (e.g., hydrated or anhydrous) may be manipulated to adjust the particle size, such as by separation (e.g., sieving) and/or milling of the metal oxalate particulates before decomposition of the anhydrous metal oxalate compound particulates. In one embodiment, the median particle size of the anhydrous metal oxalate compound particulates is not greater than about 400 μm, such as not greater than about 200 μm, such as not greater than about 100 μm, or even not greater than about 50 μm.

FIG. 1 schematically illustrates one method for the formation of fine metal powders according to the present disclosure. In the embodiment illustrated in FIG. 1, the starting material (e.g., the feedstock) is a non-oxalate metal compound. Specifically, as illustrated in FIG. 1, the starting material is a metal oxide 102. Although illustrated as a metal oxide 102, the starting material may also be another metal compound including, but not limited to, a metal chloride, a metal carbonate, a metal sulfate, or combinations thereof. The starting material may be of relatively high purity (e.g., 98% or greater) to reduce the concentration of impurities that report to the subsequent leaching step 140. The starting material may be in the form of particles or granules, e.g., to facilitate subsequent leaching.

In the leaching step 140, the metal oxide 102 is contacted with an acid to solubilize (e.g., to digest) the metal oxide 102. As illustrated in FIG. 1, the acid is hydrochloric acid 104, however the acid may comprise other inorganic acids including, but not limited to, sulfuric acid ($H_2SO_4$) or nitric acid ($HNO_3$). The HCl 104 is contacted with the metal oxide 102 in the leaching step 140 for a time and under conditions of temperature and pressure to solubilize substantially all of the metal in the metal oxide 102. For example, the leaching step 140 may be carried out at a slightly elevated temperature of from about 75° C. to 90° C. to solubilize the metal oxide 102. As is illustrated in FIG. 1, recycled HCl 106 (discussed below) may also be used in the leaching step 140 to conserve reagent values.

The leaching step 140 produces an acidic solution of the metal, in this case a solution of metal chlorides 108. The solution is transferred to an oxalate precipitation step 142 where the metal chloride solution 108 is contacted with oxalic acid 110 in a reactor to precipitate hydrated metal oxalates and form a hydrated metal oxalate slurry 114 (e.g., comprising hydrated metal oxalate compound particulates in an acidic medium). The hydrated oxalate slurry 114 is transferred to solid/liquid separation step 144 where wash water 116 may be used during the separation of the hydrated metal oxalate compound particulates from the acidic medium, which may be transferred to a water removal step 150 for recycle of the acidic components, e.g., of HCl and oxalic acid.

The hydrated metal oxalate compound particulates 118 are then transferred to a reduction step 146 to form a fine metal powder 122. During the reduction step 146, three sub-steps are carried out to produce the fine metal powder 122: (i) the hydrated metal oxalate compound particulates are dehydrated to form anhydrous metal oxalate compound particulates; (ii) the anhydrous metal oxalate compound particulates are decomposed to an intermediate metal product; and (iii) the intermediate metal product is refined to from the fine metal powder. Although illustrated in FIG. 1 as occurring in the same reactor (e.g., in a continuous, multi-step fashion), any one or each of the three sub-steps may be carried out separately.

As illustrated in FIG. 1, the hydrated metal oxalate compound particulates are first heated in a reactor to a dehydration temperature to remove water, and are then heated to a higher decomposition temperature to decompose the dehydrated metal oxalate to an intermediate metal product. Finally, the intermediate metal product is heated to a yet higher refining temperature to form the fine metal powder 122. A reducing gas composition, here being a mixture of $H_2/N_2$ 120, is used as the dehydration gas, the decomposition gas and the refining gas. As noted above, different gas compositions can be used for the dehydration step, the decomposition step and the refining step. The sub-steps of the refining step 146 may be carried out in a fluidized bed reactor, a tube furnace, or a pressurized kiln, for example.

The gaseous by-products of the refining step 146 are removed and transferred to a condenser 148 where a portion of the water is condensed from the gaseous phase and off-gasses 124 such as $CO_2$ may be vented. Additional water is removed in a water removal step 150 as may be vented as water vapor 126. The components of the effluent leaving the water removal step 150 are predominately HCl and $H_2C_2O_4$, which can be separated by transferring the effluent to a chilling step 152 to condense and precipitate the oxalic acid as crystals. After solids/liquid separation 154, recycled oxalic acid 112 may be returned to the precipitation step 142 and recycled HCl 106 may be returned to the leaching step 140.

The foregoing method enables the rapid and economical production of fine metal powders from metal compounds. For example, the use of gases that are dilute with respect to hydrogen (e.g., comprising not greater than about 15% hydrogen) enable the use of higher temperatures (e.g., greater than 700° C.) for the refinement of the metal powder to remove impurities such as carbon and oxygen, particularly for fine rare earth metal powders. Carrying out the process steps (e.g., decomposition and refinement) under elevated pressures enables interparticle diffusion of the dilute hydrogen gas into the fine particles. If the metal compounds (e.g., the hydrated metal oxalate particulates) has a high purity with respect to the metal, then the fine metal powder will also have a high purity with respect to the metal. While not wishing to be bound by any particular theory, it is believed that the foregoing method enables the decomposition of the metal oxalate to the metal without the intermediate formation of a metal oxide or metal hydroxide.

Figure 2A:
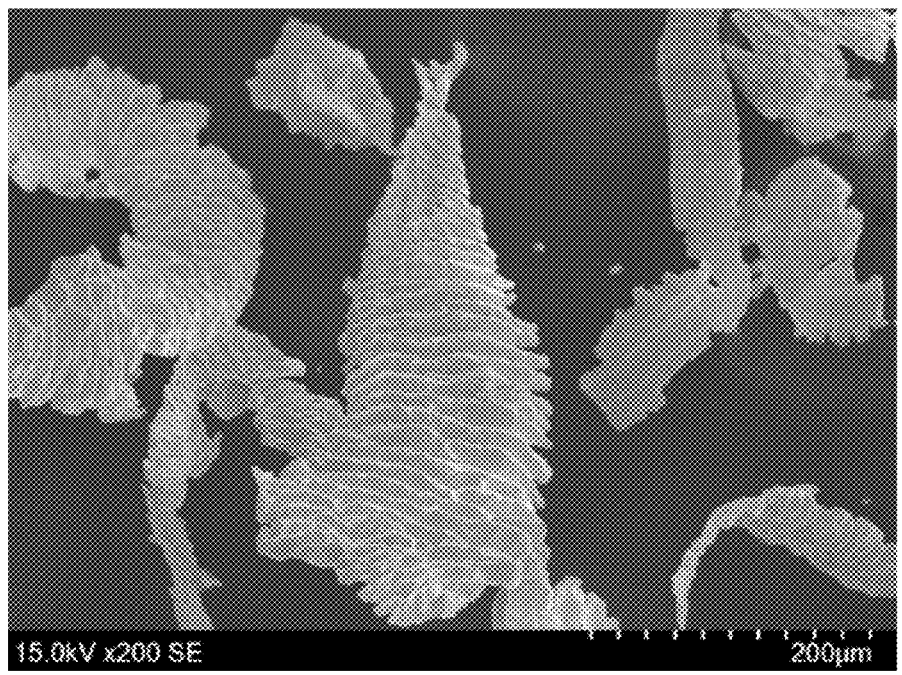
FIGS. 2A and 2B illustrate SEM photomicrographs of a commercially available metal powder and a fine metal powder produced according to the present disclosure.
Figure 2B:
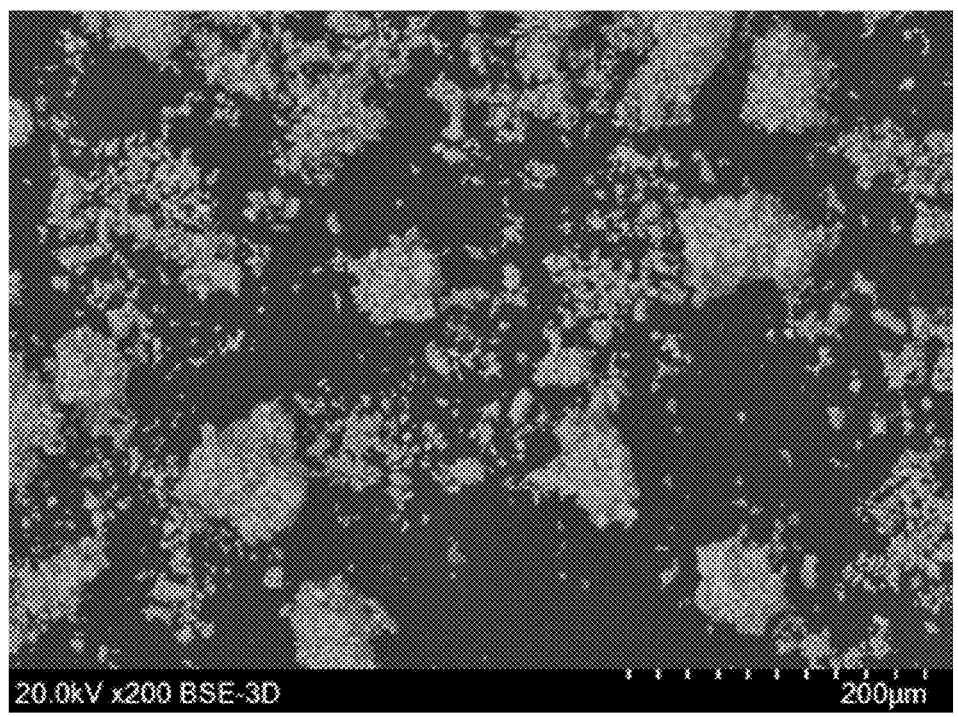

FIGS. 2A and 2B illustrate SEM (Scanning Electron Microscope) images of a commercially available metal powder (FIG. 2A) and a fine metal powder produced in accordance with the foregoing methods (FIG. 2B). Specifically, FIG. 2A illustrates a commercially available lanthanum powder having a median particle size of about 250 µm. In addition to being very large in size, the particles are plate-like and have a high aspect ratio. In contrast, FIG. 2B illustrates a fine dysprosium metal powder at the same magnification as FIG. 2A. The fine dysprosium metal powder has a median particle size of less than 10 µm.

EXAMPLES

NdPr Powder

A mixture of hydrated neodymium oxalate $Nd_2(C_2O_4)_3.10H_2O$ and hydrated praseodymium oxalate $Pr_2(C_2O_4)_3.10H_2O$ in a 1:1 molar ratio (Nd:Pr) is prepared by admixing the two powders. The admixture has a mass of about 105.82 mg. The admixture is heated in a fluidized bed reactor in 4 sequential steps of temperatures 360° C., 620° C., 900° C. and 1200° C. The resulting metal powder product has a high purity, with undetectable levels of carbon and hydrogen (e.g., <0.5% C and <0.5% H) and undetectable levels of oxygen, nitrogen and sulfur (e.g., <0.1% O, <0.1% N and <0.1% S).

NdFeB Powder

A mixture of hydrated neodymium oxalate $Nd_2(C_2O_4)_3.10H_2O$ and hydrated iron oxalate $FeC_2O_4.2H_2O$ is prepared by admixing the two powders, and boron metal powder is added to the mixture. The admixture has a mass of about 158.79 mg (42.57 mg of hydrated neodymium oxalate, 115.45 mg of iron oxalate and 0.78 mg metallic boron). The admixture is heated in a fluidized bed reactor in 4 sequential steps. The first step is carried out at a temperature of about 240° C. to remove the water of hydration, about 24% of the total mass. The pressure after the first step is 2.7 bar. The temperature is raised to 320° C. and then to 720° C. under a pressure of about 4 bar. After about one hour, the mass decreases by an additional 69% to about 110 mg. The powder is then heated to about 1200° C. and held for about one hour. The resulting metal powder product has a high purity, with undetectable levels of carbon and hydrogen (e.g., <0.5% C and <0.5% H) and undetectable levels of oxygen, nitrogen and sulfur (e.g., <0.1% O, <0.1% N and <0.1% S).

Cobalt Powder

A fine cobalt metal powder is produced from hydrated cobalt oxalate ($CoC_2O_4.nH_2O$) in accordance with the methods disclosed herein. Upon analysis of the fine cobalt metal powder, it was found to comprise 99.63% cobalt metal.

Dysprosium Powder

A fine dysprosium metal powder is produced from hydrated dysprosium oxalate ($Dy_2(C_2O_4)_3.nH_2O$) in accordance with the methods disclosed herein. Upon analysis of the fine dysprosium metal powder, it was found to comprise 99.93% dysprosium metal, with 0.03% carbon contamination.

While various embodiments of a method for the production of a fine metal powder have been described in detail, it is apparent that modifications and adaptations of those embodiments will occur to those skilled in the art. However, it is to be expressly understood that such modifications and adaptations are within the spirit and scope of the present disclosure, including the use of known and appropriate engineering vessels and reactors.

What is claimed is:

1. A method for the production of fine metal powder comprising at least a first rare earth metal from metal compound particulates, comprising the steps of:

heating anhydrous metal oxalate compound particulates comprising particulates of a metal oxalate compound of at least a first rare earth metal to a decomposition temperature of at least about 320° C. and under a decomposition pressure of at least 2 bar and holding the anhydrous metal oxalate compound particulates under a decomposition gas comprising at least about 3 vol. % hydrogen with the balance comprising an inert gas composition comprising at least one inert gas selected from the group consisting of nitrogen and carbon monoxide, the decomposition gas and the decomposition temperature being sufficient to decompose the anhydrous metal oxalate compound particulates and form a gaseous oxalate by-product;

separating the gaseous oxalate by-product from the anhydrous metal oxalate compound particulates as the gaseous oxalate by-product is being formed, whereby intermediate metal product particulates are formed; and heating the intermediate metal product particulates to a refining temperature that is greater than the decomposition temperature and is at least about 750° C. and under a refining pressure of at least about 2 bar and holding the intermediate metal product particulates at the refining temperature, the refining pressure and under a refining gas comprising at least about 3 vol. % hydrogen with the balance comprising an inert gas composition comprising an inert gas selected from the group consisting of nitrogen and carbon monoxide, to reduce contaminants in the intermediate metal product particulates and form a fine metal powder comprising at least a first rare earth metal.

2. The method recited in claim 1, further comprising the step of:

dehydrating hydrated metal oxalate compound particulates to remove water of hydration from the hydrated metal oxalate compound particulates and form the anhydrous metal oxalate compound particulates and water vapor.

3. The method recited in claim 2, further comprising the step of separating the water vapor from the hydrated metal oxalate compound particulates during the step of dehydrating the hydrated metal oxalate compound particulates.

4. The method recited in claim 1, wherein the decomposition temperature is at least about 360° C. and not greater than about 700° C.

5. The method recited in claim 1, wherein the decomposition gas comprises not greater than about 0.01 vol. % oxygen.

6. The method recited in claim 1, wherein the decomposition gas comprises at least about 50 vol. % nitrogen.

7. The method recited in claim 1, wherein the decomposition pressure is not greater than about 6 bar.

8. The method recited in claim 1, wherein the refining temperature is at least about 800° C.

9. The method recited in claim 1, wherein the refining temperature is not greater than about 1300° C.

10. The method recited in claim 1, wherein the refining gas composition comprises not greater than about 0.01 vol. % oxygen.

11. The method recited in claim 1, wherein the refining gas composition comprises at least about 50 vol. % nitrogen.

12. The method recited in claim 1, wherein the refining pressure is at least about 3 bar.

13. The method recited in claim 1, wherein the fine metal powder comprises not greater than about 1 wt. % non-metallic impurities.

14. The method recited in claim 1, wherein the metal oxalate compound particulates include particulates of a metal oxalate compound of at least a second rare earth metal and wherein the fine metal powder further comprises at least the second rare earth metal.

15. The method recited in claim 1, wherein the metal oxalate compound particulates include particulates of a metal oxalate compound of at least a first base metal and wherein the fine metal powder comprises at least the first base metal.

16. The method recited in claim 15, wherein the first rare earth metal is neodymium and the fine metal powder further comprises iron and boron.

17. The method recited in claim 15, wherein the first rare earth metal is samarium and the fine metal powder first base metal is cobalt.

* * * * *